Oct. 16, 1928.
I. A. BAUM
1,687,536
CLAMP FOR FRAMES
Filed Oct. 6, 1927
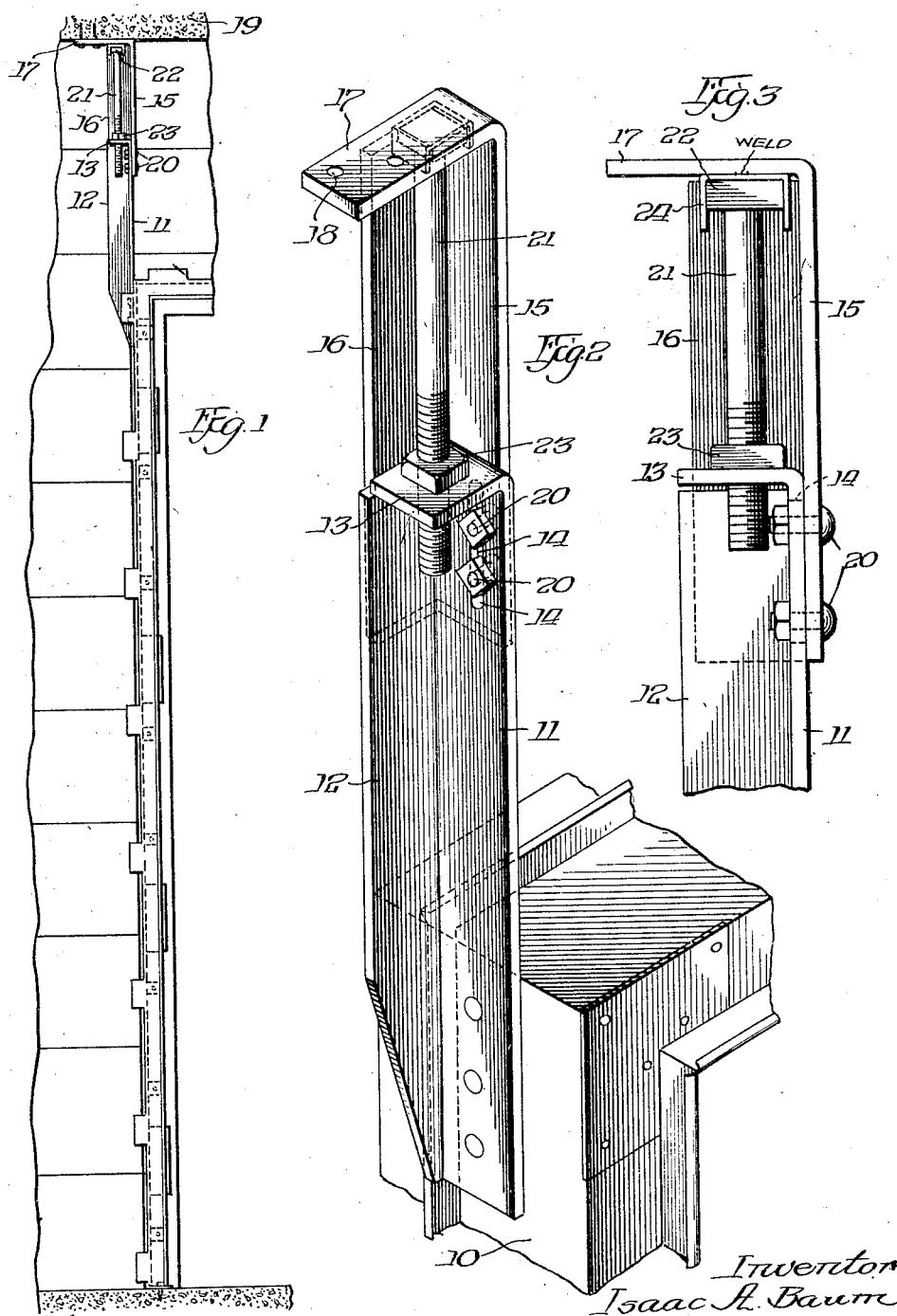

Patented Oct. 16, 1928.

1,687,536

UNITED STATES PATENT OFFICE.

ISAAC A. BAUM, OF CHICAGO, ILLINOIS.

CLAMP FOR FRAMES.

Application filed October 6, 1927. Serial No. 224,367.

My invention relates to framing means for wall openings, and particularly to a novel clamp or fastener for such frames.

In my co-pending application Serial No. 224,366, filed of even date herewith, I have disclosed a frame for wall openings, the frame being composed of angular metallic members adapted to be securely positioned relative to a masonry wall, and have indicated a form of clamp for use in connection therewith. While I am aware that other forms of clamps may be used for securely positioning the frame between the floor and ceiling, yet the device disclosed herein has features of simplicity, economy and efficiency that render it particularly valuable in that connection.

The device will be more readily understood by reference to the accompanying drawings, in which,—

Fig. 1 is a fragmentary side elevation showing the manner of use of the clamp;

Fig. 2 is an enlarged perspective view; and

Fig. 3 is an enlarged side elevation of the clamp.

The device is intended to be associated with a frame member consisting of a channel having a web 10. It will be duplicated on the two sides of the frame, but as the parts are identical only one thereof is illustrated. The base member or strut of the clamp is composed of a member angular in cross section, one leg 11 of the angle being securely riveted or otherwise firmly secured to the web 10 of the adjacent frame member. The other leg 12 of the angle acts as a stiffener and also as a support for the tongue 13, which is, in effect, a continuation of the leg 11, which is bent at right angles to form an abutment or support. The leg 11 is slotted, as at 14, for a purpose later described.

The movable member of the clamp is also of angular form, having legs 15, 16 lying alongside of and adapted to slide longitudinally relative to the strut. The leg 15 is extended beyond the leg 16 and is bent at right angles to overlie the end of the leg 16. The extended and bent over portion 17 is apertured, as at 18, to provide means for attachment by bolts or nails to the ceiling, indicated at 19. The leg 15 carries small bolts 20 which pass through the slot 14 in the leg 11, the nuts of the bolts overlying the edges of the slot and permitting limited longitudinal movement of the two angles without permitting separation thereof in shipping or handling.

A sturdy bolt 21 having a head 22 and a nut 23 is located between the abutments formed by the bent over portions 13, 17, the head being seated within a U-shaped keeper 24 secured to the part 17 to prevent rotation of the bolt. The nut bears against the top surface of the abutment 13, and it will be seen that by rotating the nut the upper or movable angle is adapted to be thrust upwardly and to function as a positive clamping means.

By using the device illustrated in the manner described the frame may be firmly and rigidly secured in place in its proper final position before the tile or masonry is laid. This facilitates building operations and results in a saving of the workmen's time. The parts composing the clamp are of common construction both as to the angles and the bolt, and the mechanical operations necessary to prepare them for use are simple and inexpensive.

Obviously, the device is capable of some modification, and I do not wish to be limited except as indicated in the appended claims.

1. The combination with a frame for wall openings, of a member angular in cross section, a second angular member loosely secured thereto and longitudinally slidable thereon, abutments provided on said two members, and a screw member bearing on and acting between said abutments and adapted to exert a thrust tending to slide the two members in a longitudinal direction.

2. The combination with a frame for wall openings, of a member angular in cross section and rigidly and permanently secured to said frame, a second member of similar cross section mounted for longitudinal movement relative to said first member, seats provided on said two members, and a bolt acting between and bearing on said seats and tending to separate the same by screw action.

3. The combination with a metallic frame, of a clamp comprising a metal angle rigidly secured to the frame and having a seat, a movable member having a bolt and slot connection with said angle and also having a seat, and a bolt the head of which abuts the seat on one member and a nut of which abuts the seat on the other member.

4. The combination with a metallic frame, of a clamp comprising a metal angle rigidly secured to the frame and having a seat, a movable member having a bolt and slot connection with said angle and also having a seat, a bolt the head of which abuts the seat on one member and the nut of which abuts the seat on the other member, and means for holding the bolt from turning while the nut is being turned.

5. The combination with a frame for a wall opening, of a vertical metal strut rigidly secured to the frame and having a seat at its upper end, a longitudinally slidable member connected to the side of the strut with capacity for limited longitudinal movement and also having a seat at its upper end, and a screw acting between the seats on said fixed and movable members to effect longitudinal movement of said movable member.

6. The combination with a frame for a wall opening of a vertical member rigidly secured to the frame, the upper end of the member being bent over to provide a horizontal seat, a second metal member mounted for limited longitudinal sliding movement relative to said first mentioned member and also having a seat at its upper end, and a screw acting between the seats on said members to effect longitudinal movement of said second member.

7. The combination with a frame for a wall opening of a metal member rigidly secured to the frame the upper end of the member being bent to provide a horizontal seat, a second member mounted for limited longitudinal movement relative to said first member, the upper end of said second member being also bent to provide a horizontal seat, and a screw acting between said horizontal seat portions to effect longitudinal movement of said second member.

8. The combination with a door frame of a pair of struts permanently connected to the frame near its upper corner, seats provided at the upper extremities of the struts, a sliding member mounted on each of said struts with capacity for limited longitudinal movement, seats provided on said sliding member, and a bolt applied to each of said devices, the head resting on one seat and the nut on the other seat whereby the sliding member may be forced upward by the action of the bolt.

In testimony whereof I have affixed my signature.

ISAAC A. BAUM.